United States Patent [19]

Sanchez, Jr.

[11] Patent Number: 4,896,806
[45] Date of Patent: Jan. 30, 1990

[54] BELT MOUNTED ROD HOLDER

[76] Inventor: Pete Sanchez, Jr., P.O. Box 8126, Albuquerque, N. Mex. 87108

[21] Appl. No.: 758,398

[22] Filed: Jul. 24, 1985

[51] Int. Cl.⁴ .............................................. A01K 97/10
[52] U.S. Cl. .................................... 224/242; 224/253; 224/200; 224/270; 224/904
[58] Field of Search ..................... 43/25; 224/922, 253, 224/270, 200, 242, 904, 913; 248/110

[56] References Cited

U.S. PATENT DOCUMENTS

| | | | |
|---|---|---|---|
| 1,198,202 | 9/1916 | Drinkard | 224/922 X |
| 2,576,624 | 11/1951 | Miller | |
| 2,822,116 | 2/1958 | Smalley et al. | |
| 2,954,909 | 10/1960 | Miller et al. | |
| 3,022,898 | 2/1962 | Loeb | 224/913 X |
| 3,063,569 | 11/1962 | Huber | 248/110 X |
| 3,115,997 | 12/1963 | Hengst | |
| 3,168,971 | 2/1965 | Goertzen | 224/253 X |
| 3,450,317 | 6/1969 | Ramer | 224/904 X |
| 3,874,573 | 4/1975 | Fruscella | |
| 4,431,122 | 2/1984 | Garmong | 224/913 |
| 4,569,466 | 2/1986 | Webber | 224/922 X |

*Primary Examiner*—Henry J. Recla
*Attorney, Agent, or Firm*—Fleit, Jacobson, Cohn, Price, Holman & Stern

[57] ABSTRACT

A generally horizontally disposed U-shaped holder is provided including a pair of laterally registered and spaced apart generally horizontal and parallel arms interconnected at one pair of corresponding ends by a bight portion extending therebetween. The bight portion includes a structure for support of the holder from a waist encircling belt with the arms spaced along and projecting horizontally outwardly from the belt. The arms include registered upwardly opening notches formed therein for cradling longitudinally spaced portions of a fishing rod handle therein. Also, structure is provided for releasably retaining fishing rod handle portions in the aforementioned upwardly opening notches against upward displacement therefrom.

3 Claims, 3 Drawing Sheets

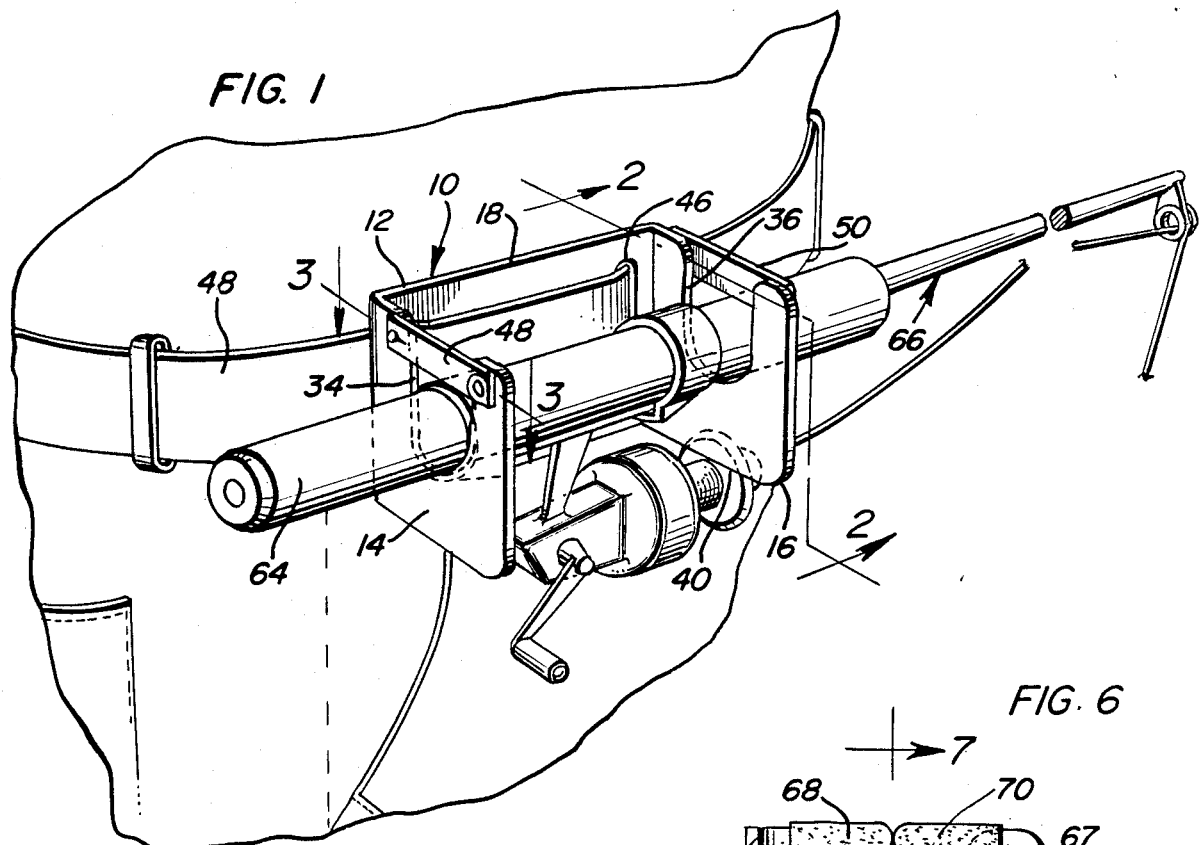
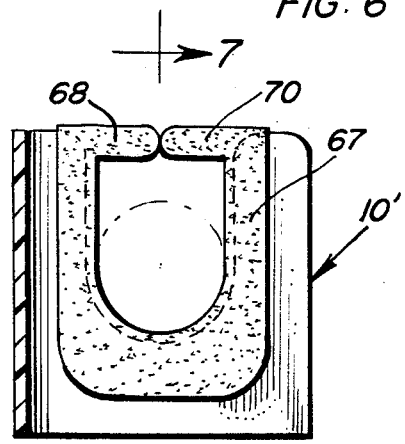
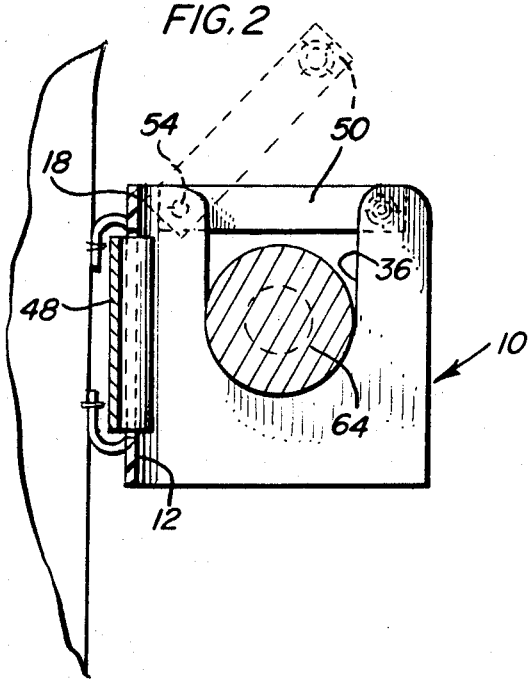
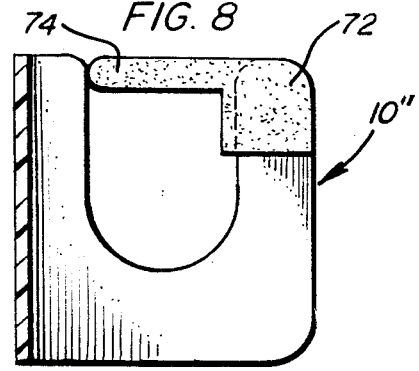

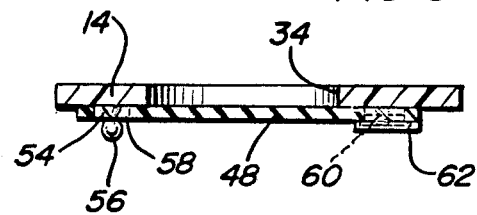
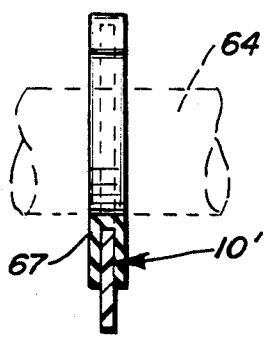
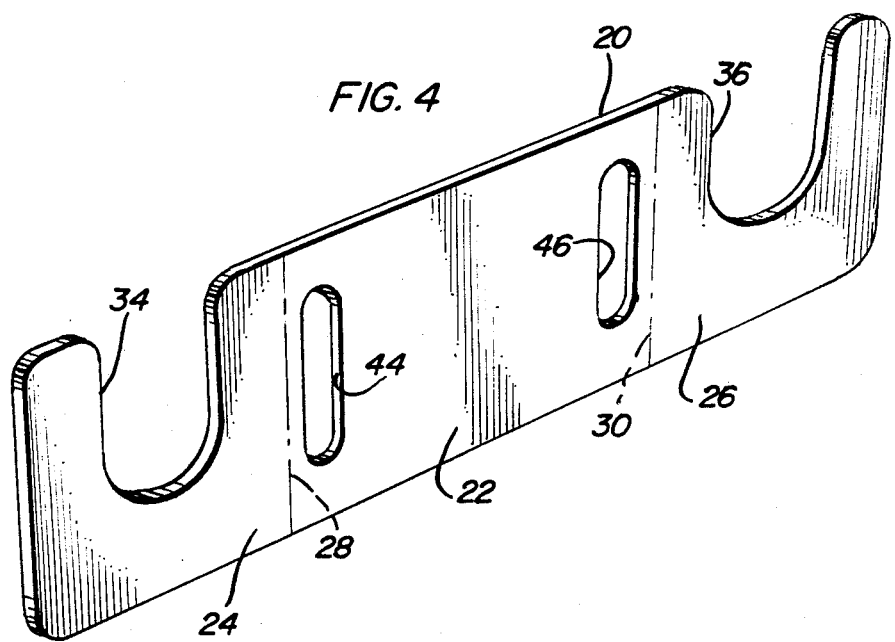
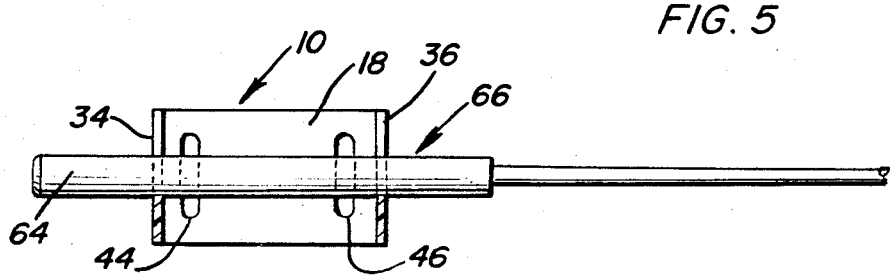

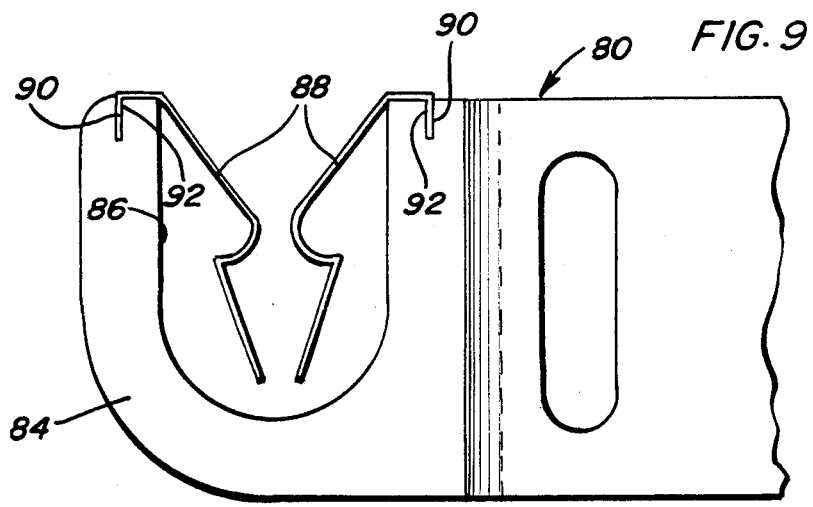
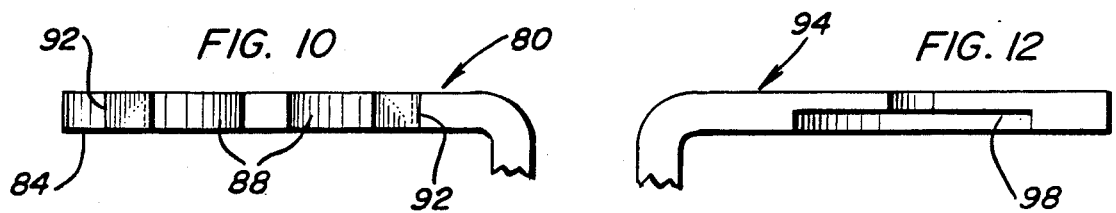
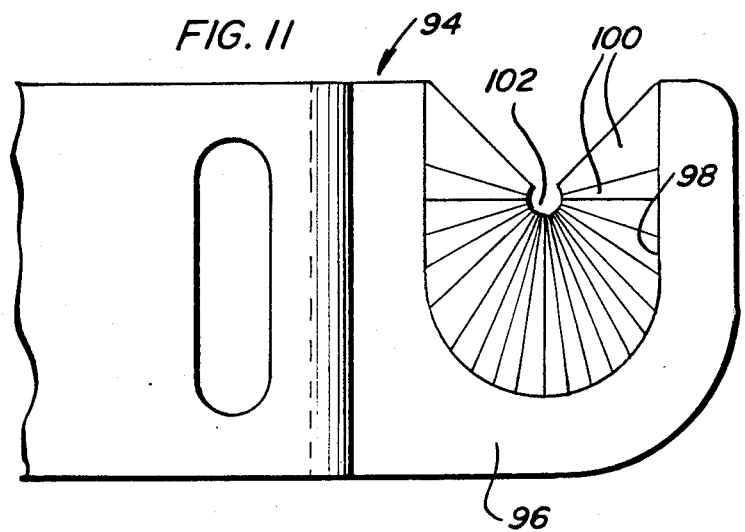
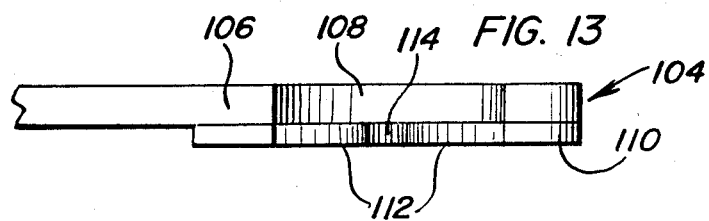

BELT MOUNTED ROD HOLDER

BACKGROUND OF THE INVENTION

1. Field of the Invention

This invention relates to a holder and more specifically to a holder for mounting from the belt of a fisherman and including spaced structural portions thereof from which longitudinally spaced handle portions of a fishing rod may be supported, the holder being provided to enable a fishing rod to be supported from waist area of a fisherman while he (or she) uses his (or her) hands to perform tasks other than holding a fishing rod.

2. Description of Related Art

Various different forms of holders including some of the general structural and operational features of the instant invention are disclosed in U.S. Pat. Nos. 2,576,624, 2,822,166, 2,954,909, 3,115,997 and 3,874,573. However, these various different forms of holders are not designed the specific function performed by the holder of the instant invention.

SUMMARY OF THE INVENTION

The holder of the instant invention comprises a generally horizontal U-shaped member including a pair of laterally registered and spaced apart generally horizontal and parallel arms interconnected at one pair of corresponding ends by a bight portion extending therebetween. The bight portion includes structure for support from a waist encircling belt with the arms of the holder spaced along and projecting horizontally outwardly from the belt. The arms include registered upwardly opening notches formed therein for cradling longitudinally spaced portions of a fishing rod handle therein and at least one of the arms includes structure operative to releasably retain the corresponding fishing rod handle portion therein against upward displacement therefrom.

The main object of this invention is to provide a support or holder which may be conveniently worn by a fisherman and utilized to support a fishing rod from his body in a convenient position and in a manner enabling the fisherman to perform varied tasks with his hands.

Another object of this invention is to provide a fishing rod holder specifically designed to be supported from the belt of a fisherman.

A further object of this invention is to provide a holder in accordance with the preceding objects and which may be constructed of various different materials.

Yet another object of this invention is to provide a fishing rod holder which will be capable of holding different types of fishing rods.

A final object of this invention to be specifically enumerated herein is to provide a belt mounted fishing rod holder in accordance with the preceding objects and which will conform to conventional forms of manufacture be of simple construction and easy to use so as to provide a device that will be economically feasible, long lasting and relatively trouble free in operation.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 1 is a perspective view of the rod holder of the instant invention in use supporting a conventional form of fishing rod from the belt of the fisherman;

FIG. 2 is a fragmentary enlarged vertical sectional view taken substantially upon the plane indicated by the section line 2—2 of FIG. 1 and with one of the fishing rod handle retaining straps of the holder illustrated in a release position by phantom lines;

FIG. 3 is an enlarged horizontal sectional view taken substantially upon the plane indicated by the section line 3—3 of FIG. 2;

FIG. 4 is a perspective view of a typical sheet stamping from which the major component of the instant invention may be constructed;

FIG. 5 is a schematic sectional view illustrating a first manner of usage of the invention;

FIG. 6 is an enlarged sectional view similar to FIG. 2 but illustrating a first modified form of the invention;

FIG. 7 is a vertical sectional view taken substantially upon the plane indicated by the section line 7—7 of FIG. 6;

FIG. 8 is a vertical sectional view similar to FIG. 6 and illustrating a second modified form of the instant invention;

FIG. 9 is a fragmentary elevational view of one end of a bendable blank of a third modified form of the invention;

FIG. 10 is a top plan view of the blank end of FIG. 9 after being bent;

FIG. 11 is a fragmentary elevational view similar to FIG. 9, but of a fourth modified form;

FIG. 12 is a top plan view of the blank end of FIG. 11; and

FIG. 13 is a fragmentary top plan view of a fifth modified form of the invention.

DESCRIPTION OF THE PREFERRED EMBODIMENTS

Referring now more specifically to the drawings, the numeral 10 generally designates a first form of rod holder constructed in accordance with the present invention. The holder 10 includes a generally U-shaped mount 12 including a pair of generally parallel and laterally spaced apart arms 14 and 16 joined at one pair of corresponding ends by a bight portion 18 extending therebetween. As may best be seen from FIG. 4 of the drawings, the mount 12 may be formed from a single shape retentive and bendable elongated sheet or panel 20 including a midportion or section 22 and opposite end portions or sections 24 and 26. In order to form the mount 12 from the sheet 20, the end portions 24 and 26 are bent to positions disposed at substantially right angles relative to the mid-portion 22 along bend lines 28 and 30. The sheet 20 may be constructed of metal (noncorrosive), plastic or other similar material.

The arms 14 and 16 include upwardly opening notches 34 and 36 formed therein. The bight portion 18 includes longitudinally spaced slots 44 and 46 formed therein through which longitudinally spaced portions of a waist encircling belt 48 may be threaded and a pair of resilient strap members 48 and 50 have a first pair of ends anchored relative to the arms 14 and 16 in any convenient manner as at 54. The manner of attachment at 54 may be permanent and non-pivoting or a pivot connection as illustrated wherein a headed pin 56 carried by each of the arms 14 and 16 is received through a slotted portion 58 of the corresponding strap member. In addition, each arm 14 and 16 includes a male snap member 60 supported therefrom on the opposite side of the corresponding upwardly opening notch and the adjacent end of the corresponding strap member includes a female snap member 62 engageable with the male member 60. Accordingly, the strap members 48 and 50 may be secured in positions closing the upper extremities of the notches 34 and 36 in the manner illustrated in FIG. 1 of the drawings. However, the strap members 48 and 50 also may be released at the connection between the strap members 60 and 62 and swung upwardly in the manner illustrated in phantom lines in FIG. 2 of the drawings, whereby the open upper extremities of the notches 34 and 36 are uncovered.

In operation, the user's belt 48 is threaded through the openings or slots 44 and 46 in order to secure the holder 10 to the user's belt 48. Then, the handle 64 of a fishing rod referred to in general by the reference numeral 66 may have longitudinally spaced portions thereof cradled in the notches 34 and 36 and retained therein by the strap members 48 and 50. This frees the hands of the user to perform other tasks such as baiting a hook, changing lures. Also, use of the holder 10 frees the user's hands for steadying the user when walking through rocks and also enables the user to take a "smoke break" or "drink break".

In addition to using the notches 34 and 36 for support of the fishing rod handle 64 from the holder 10 in the manner illustrated in FIG. 5, inasmuch as the holder 10 is symmetrical, it may be worn and used on either side of the user. Further, the user may be either right-handed or left-handed if the holder 10 is supported at the front of the user.

With attention now invited more specifically to FIGS. 6 and 7 of the drawings, a modified form of holder is referred to in general by the reference numeral 10' and is identical to the holder 10, except that the holder 10 does not include strap members corresponding to the strap members 48 and 50. Rather, the holder 10 includes a pair of resilient bodies 67 which are generally U-shaped in configuration and grooved to be slidingly engaged with those portions of the arms 14 and 16 defining the notches 34 and 36. Each body 67 includes integral inwardly projecting partial arms 68 and 70 which serve to yieldingly close the upper portions of the notches defined thereby.

With attention now invited more specifically to the FIG. 9 of the drawings, there may be seen yet another modified form of holder referred to in general by the reference numeral 10" and wherein a pair of resilient bodies 72 are provided and telescopingly engaged with the outer extremities of the arms of the holder 10'. The bodies 72 include resilient arm portions 74 which substantially bridge the upper extremities of the corresponding upwardly opening notches. The resilient arm portions 74 may be deflected to out-of-the-way positions enabling the handle 64 of the fishing rod 66 to be received in the corresponding notches for support therein. Accordingly, operation of the holders 10' and 10" is substantially the same as the operation of the holder 10.

With attention now invited more specifically to FIGS. 9 and 10, the reference numeral 80 generally designates a fragmentarily illustrated bendable blank of a third modified form of the invention wherein each end portion 84 includes a notch 86 formed therein corresponding to the notches 34 and 36. However, each notch 86 includes a pair of specifically contoured spring clamp arms 88 projecting therein from opposite sides thereof, the arms 88 including right angled anchor portions 90 secured in slots 92 formed in the blank 80. The spring clamp arms 88 are operative to clampingly engage a handle corresponding to the handle 64 therebetween.

With attention now invited more specifically to FIGS. 11 and 12, the reference numeral 94 generally designates a blank end of a fourth modified form of the invention constructed of stiff but resilient material. The blank 94 includes a pair of end portions 96 corresponding to the end portions 84 and wherein a U-shaped relieved area 98 has been formed by molding or routing processes. In addition, the end portion 96 includes a plurality of generally radially inwardly projecting resilient integral tangs 100 extending toward an open area 102 generally centered in the relieved area 98 above the mid-height level thereof. The tangs 100, because of their reduced thickness, are readily easily bent and together comprise clamp means for retaining a handle such as the handle 64 in position supported from the end portion 96.

With attention now invited more specifically to FIG. 13, the reference numeral 104 generally designates a blank similar to the elongated sheet 20 and including opposite end portions 106 corresponding to the end portions 24 and 26. The end portions 106 have upwardly opening notches 108 formed therein corresponding to the notches 34 and 36 and a panel 110 of stiff but bendable material is secured over one side of the end portion 106. The panel 110 includes radial tangs 112 corresponding to the tangs 100 and which extend inward toward an open central area 114 registered with the central area of the notch 108. Accordingly, the tangs 112 of the panel 110 are operative to clampingly engage a handle corresponding to the handle 64 in the same manner in which the tangs 100 are operative to clampingly engage a fishing rod handle.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. A belt mounted rod holder including a generally horizontally disposed U-shaped holder including a pair of laterally registered and spaced apart generally horizontal and parallel arms interconnected at one pair of corresponding ends by a bight portion extending therebetween, said bight portion including means for support from a waist encircling belt with said arms spaced along and projecting horizontally outwardly from said belt, said arms including registered upwardly opening notches formed therein for cradling longitudinally spaced portions of a fishing rod handle therein, said arms each including retaining means operative to releasably retain the corresponding fishing rod handle portion therein against upward displacement from the corresponding notch, said bight portion including a pair of belt receiving openings formed therein and spaced apart along said bight portion between said arms, said retaining means each including resilient means extending at least substantially entirely across the upper extremity of the corresponding notch to define a resilient closure therefor and defining an unobstructed major height portion of the corresponding notch therebelow in which to receive a fishing rod handle cross sectional area, said resilient means each including a generally resilient U-shaped body provided with an outer peripheral groove in which the portions of the corresponding arms defining the upwardly opening notch therein are seated, the open end of said U-shaped body including opposite inwardly directed resilient arm portions for releasably closing the open end of said U-shaped body.

2. A belt mounted rod holder comprising a vertical, horizontally elongated panel having an upper edge and including an elongated longitudinally extending mid-section as well as opposite end sections between which said mid-section is disposed, said mid-section including vertical slots formed therein at points spaced longitudinally along said mid-section, said end sections including notches formed therein opening upwardly through said upper edge of said panel, said end sections being disposed generally 90 degrees relative to said mid-section with said end sections projecting outwardly of the same vertical side of said panel to define a generally horizontally opening U-shaped holder, said notches being aligned along a straight path generally paralleling said mid-section, each of said end sections including inwardly projecting and convergent resilient tangs formed integrally with and projecting inwardly of the portions of said each end section disposed about the corresponding notch with the inner ends of said tangs spaced apart.

3. The holder of claim 2 wherein said tangs project inwardly from said portions of each end section disposed about the corresponding notches toward a central area thereof spaced above the mid-height level thereof.

* * * * *